United States Patent [19]
Kaschel et al.

[11] Patent Number: 5,994,445
[45] Date of Patent: *Nov. 30, 1999

[54] POLYAMIDE MIXTURES WHICH CONTAIN SOLID PARTICLES

[75] Inventors: Gregor Kaschel; Rudi Klein, both of Walsrode, Germany

[73] Assignee: Wolff Walsrode AG, Walsrode, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,941

[22] Filed: Jul. 7, 1997

[30] Foreign Application Priority Data

Jul. 11, 1996 [DE] Germany .............................. 196 27 905

[51] Int. Cl.⁶ ...................................................... C08L 77/00
[52] U.S. Cl. ........................... 524/444; 524/413; 524/445; 524/538; 525/432
[58] Field of Search ..................................... 524/444, 445, 524/413, 538; 525/432

[56] References Cited

U.S. PATENT DOCUMENTS

| | | | |
|---|---|---|---|
| 3,080,345 | 3/1963 | Brooks et al. ............................. | 260/78 |
| 4,804,720 | 2/1989 | Tamura et al. ........................... | 525/431 |
| 5,147,944 | 9/1992 | Takeda ..................................... | 525/432 |
| 5,248,720 | 9/1993 | Deguchi et al. ......................... | 524/444 |
| 5,541,011 | 7/1996 | Takashige et al. ...................... | 428/213 |
| 5,547,765 | 8/1996 | Degrassi et al. ........................ | 428/474.7 |

FOREIGN PATENT DOCUMENTS

| | | |
|---|---|---|
| 0358415 | 3/1990 | European Pat. Off. .......... C08K 3/34 |
| 0458470 | 11/1991 | European Pat. Off. . |
| 0514146 | 11/1992 | European Pat. Off. . |
| 0540293 | 5/1993 | European Pat. Off. . |
| 2817027 | 7/1979 | Germany . |
| 3811544 | 10/1988 | Germany . |
| 7900946 | 11/1979 | WIPO . |
| 9304118 | 3/1993 | WIPO . |
| 9507180 | 3/1995 | WIPO . |

OTHER PUBLICATIONS

Hawley's Condensed Chemical Dictionary, 12th Edition p. 1035.

*Primary Examiner*—Ana Woodward
*Attorney, Agent, or Firm*—Sprung Kramer Schaeffer & Briscoe

[57] ABSTRACT

The present invention relates to a mixture consisting of 60 to 98 wt. % of a partially crystalline polyamide polymerised from m-xylylene diamine and adipic acid, 2 to 40 wt. % of an aliphatic polyamide containing inorganic particles with a characteristic particle diameter of less than 800 nm, wherein the proportion of organic and/or inorganic particles in the polymer mixture is less than 10 wt. %.

6 Claims, No Drawings

POLYAMIDE MIXTURES WHICH CONTAIN SOLID PARTICLES

Many products are packed in sheet materials. Processing on packaging machines frequently requires films which can be sterilised. Great importance is attached to oxygen permeability because it is a decisive factor in determining storage time. Transparency after sterilisation in aqueous surroundings at appr. 120°–130° C. is of particular importance here. The present invention relates to a polymer mixture containing a polymer consisting of m-xylylene diamine and adipic acid, and an aliphatic polyamide and organic or inorganic particles with a characteristic length of less than 800 nm.

Polymers relating to the prior art are described, inter alia, by Domininghaus (Hans Domininghaus: Die Kunststoffe und ihre Eigenschaften, VDI-Verlag 1992, Düsseldorf). For specific reference to barrier technology see Shires (David Shires: Developments in Barrier Technology, Pira International 1993, UK) and for reference to packaging see The Wiley Encyclopedia of Packaging Technology (ads. M. Bakker, D. Eckroth; John Wiley & Sons, 1986) and for special reference to plastics films see Nentwig (Joachim Nentwig: Kunststoff-Folien, Carl Hanser Verlag 1994, Munich).

Many patents deal with mixtures consisting of polyamides and EVOH. However a factor which is common to all these mixtures, because they all contain EVOH, is that they may delaminate during heat sterilisation under aqueous conditions, since EVOH is soluble in water.

WO 9507180 describes a sterilisable film containing at least 3 layers, wherein the inner layer is a blend of an aliphatic/aromatic polyamide and EVOH. Mixtures containing polyamide and EVOH are not as mechanically robust as pure polyamide and also the extrusion of this mixture causes problems, resulting from thermal damage to the EVOH. WO 9304118 describes a polymer composition which contains less than 60 wt. % of disc-like particles with an average thickness of less than 5 nm. Increased strength, rigidity and permeability are mentioned as advantages. The effect of the nanoparticles on transparency, in particular after thermal treatment, is not mentioned.

A polymer or polymer mixture is needed which satisfies the following requirements:
1. an effective oxygen barrier
2. no significant change in transparency during sterilisation
3. no lamination after heat sterilisation.

Combining two aspects is very difficult. Thus, for instance, a very effective water vapour barrier can be achieved with EVOH but EVOH is not suitable for wet steam sterilisation because it becomes cloudy during sterilisation. It is known that PA MXD6 is the polyamide with the best barrier properties (David Shires: Developments in Barrier Technology, Pira International 1993, UK, page 24). PA MXD6 also becomes cloudy during sterilisation. Therefore, it has to be mixed with e.g. PA6 in order to inhibit clouding. This again results in the oxygen barrier being reduced (product description for Nylon-MXD6 from the Mitsubishi Gas Chemical Co.).

The following general data apply to this application:

All the polymers mentioned are commercially available trade products. In the case of mixtures, unless stated otherwise, the concentrations of the individual polymers are expressed in wt. %. The polymers contributing to a given mixture are included within round brackets, "("and")", and linked to each other with a "+" sign. The densities quoted are determined at 23° C. in accordance with ISO 1183. The melt flow index MFI is measured at a temperature of 190° C. and with an applied weight of 2.16 kg in accordance with ISO 1133, if no other information is given. Polymers are abbreviated in accordance with the agreed convention. Different polymers from the same class are identified by a hyphen and a number (example: LLDPE-2). "Polyamides" are understood, in the widest sense, to be polymeric compounds which are linked to each other via the amide group —NH.CO— (see also Kunststoff-Handbuch vol. VI, Polyamide, Carl Hanser Verlag, Munich 1966). Two groups of polyamides may be differentiated: those built up from one monomer by polycondensation of ω-aminocarboxylic acids or by polymerisation of their lactams to give a polyamide 6 and those which are produced from two monomers (diamines and dicarboxylic acids) by polycondensation to give a polyamide 66 (Gnauck, Frundt: Einsteig in die Kunststoffchemie,) Carl Hanser Verlag, Munich 1991). The polyamides are named using numbers which give the number of carbon atoms in the starting material or, in the case of two components, in the diamine (first number) and in the dicarboxylic acid (second number).

The expression "aliphatic polyamides" refers to all those polyamides in which the monomers are either aliphatic ω-aminocarboxylic acids (e.g. PA 6) or else aliphatic diamines and aliphatic dicarboxylic acids (e.g. PA 66).

| Abbreviation | ω-amino-carboxylic acid or lactam | diamine | dicarboxylic acid | Comment |
|---|---|---|---|---|
| PA 6 | ε-caprolactam | — | — | aliphatic |
| PA 11 | 11-amino-undecanoic acid | — | — | aliphatic |
| PA 12 | ε-lauric lactam | — | — | aliphatic |
| PA 66 | — | hexamethylene diamine | adipic acid | aliphatic |
| PA 610 | — | hexamethylene diamine | sebacic acid | aliphatic |
| PA 6I | — | hexamethylene diamine | isophthalic acid | semi-aromatic, amorphous |
| PA MXD6 | — | m-xylylene diamine | adipic acid | semi-aromatic |
| PA 6/66 | ε-caprolactam | hexamethylene diamine | adipic acid | copolyamide, aliphatic |
| PA 6/6T | ε-caprolactam | hexamethylene diamine | terephthalic acid | copolyamide |
| PA 6I/6T | — | hexamethylene diamine | isophthalic acid and terephthalic acid | copolyamide, semi-aromatic |
| PA 6/6I | ε-caprolactam | hexamethylene diamine | isophthalic acid | copolyamide |
| PA 6/66 | ε-caprolactam and ε-lauric lactam | — | — | copolyamide |

Table explaining the nomenclature of polyamides

"Nanoparticles" (abbreviation=NP) are understood to be particles which have a characteristic particle diameter in the nanometer region. Nanoparticles may consist of organic or inorganic substances. The characteristic particle diameter is understood to be the chord length of the particle.

"EVOH" (ethylene/vinyl alcohol copolymer) preferably contains 40 to 85 mol-% of vinyl acetate which has been up to at least 90% saponified. The melt flow rate MFI is preferably in the range 0.7 to 20 g,10 min, measured at 190° C. with an applied weight of 2160 g in accordance with ISO 1133. The density is preferably in the range 1.1 to 1.3 g/cm³ measured in accordance with ASTM D1505.

The outermost layer of the film with the lowest melting point is called the "sealing layer". If the external layers contain polymer mixtures, then the external face of the film which contains the lowest melting component is called the sealing layer. In data relating to the film constituents, the sealing layer is written on the right, if no other information is given.

"LDPE" refers to a low density polyethylene with a density in the range 0.86 to 0.93 g/cm$^3$. LDPE molecules are characterised by a high degree of branching.

"LLDPE" refers to linear low density polyethylenes which contain one or more $\alpha$-olefins with more than 3 carbon atoms as comonomers, in addition to ethylene.

According to the invention, the object stated above is achieved by a mixture consisting of 60 to 98 wt. % of a partially crystalline polyamide polymerised from m-xylylene diamine and adipic acid, 2 to 40 wt. % of an aliphatic polyamide containing inorganic particles with a characteristic particle diameter of less than 800 nm, wherein the proportion of organic and/or inorganic particles in the polymer mixture is less than 10 wt. %.

The nanoparticles used may be of the organic or inorganic type. In the case of inorganic particles, natural or synthetic sheet silicates are particularly suitable.

Among naturally occurring sheet silicates are included in particular those of the montmorillonite type. In the case of synthetic sheet silicates, those of the fluoromica type, which are obtained by reacting talcum with fluoridic salts. Furthermore, any oxides or nitrides of the transition metals may be used. In the case of organic nanoparticles, the salts of aliphatic mono or dibasic salts or arylalkyl acids may be used, for instance.

Mixing the different polymers may expediently be performed by intensive mixing of the granules prior to placing in the extruder. The substances are then intensively mixed and the additives are dispersed in the extruder.

Mixing according to the invention may be performed in any extrusion devices. The mixture according to the invention can be combined with a very wide variety of substrates. Substrates which may be used are, for example, paper, aluminium foil, cellophane, biaxially oriented polypropylene (BOPP), biaxially oriented polyalkylene terephthalate, stretched and non-stretched polyamide, polycarbonate, polyvinylalcohol, polystyrene or oriented polystyrene, metallised films based on polyolefins and combinations of the substrates mentioned. All the substrates listed may have monolayered or multilayered structures. The substrates may be coloured, lacquered or printed and may also be coloured, lacquered and printed in any combination.

When processing the polymer mixture according to the invention to produce a film, sheet or other moulded item, coextrusion techniques and any other techniques for combining plastics films such as, for instance, adhesive lamination, coating and extrusion lamination, may naturally be used. If the mixture or coextrudate containing the mixture according to the invention is processed to produce films, these may also be stretched (either monoaxially or biaxially). Heusen (Heusen, Knappe, Potente: "Handbuch der Kunststoffextrusionstechnik", Carl Hanser Verlag, Munich, 1986) provides an explanation of the term "stretching" and processes for the production of stretched films. The following table shows a selection of possible types of combinations. It is of course also possible to produce other structures.

No. Structure
1 PA/PAM2
2 PA/PAM2/PA
3 PAM1/PAM2/PA
4 PAM1/PAM2/PAM1
5 PA/PAM2/HV/(LDPE+LLDPE)
6 PAM1/PAM2/HV/EVA
7 PAM2/HV/PAM2/HV/I
8 HDPE/HV/PAM1/PAM2/HV/HDPE
9 LDPE/HV/PAM2/HV/PAM2/HV/I
10 PA/PAM2/PA/HV/(EVA+LDPE)
11 PP/HV/PAM2/HV/PAM2/HV/I Explanation of the table:
PA=general polyamide PAM1=PA+NP (NP=nanoparticles) PAM2=PA MXD6+PAM1 HV=adhesive layer; this may be a coextruded bonding agent or an adhesive layer which has been applied.

I=ionomers, copolymers consisting of ethylene and acrylic acid and/or methacrylic acid, the chain molecules of which are crosslinked by ionic bonding. The ionic crosslinkage is reversible. Sodium or zinc ions are usually employed.

Surprisingly, it is possible, using the polymer mixture according to the invention, to produce very transparent films with exceptional barrier properties. The requirements mentioned above are satisfied in a particularly effective manner by films according to the invention.

It could not have been expected that the polymer mixture according to the invention would be extremely transparent and have better oxygen barrier properties than PA MXD6 before and after sterilisation.

The invention also provides, therefore, use of the films according to the invention, combined with sealing layers consisting of polyolefins such as, for example, polyethylene (LDPE, HDPE), polypropylene, ethylene/a-olefin copolymers (LLDPE) prepared using conventional Ziegler-Natta catalysts or metallocene catalysts, or contain polymers derived from olefins such as, for example, ethylene/vinyl acetate copolymers (EVA), ethylene copolymers with unsaturated esters (e.g. EBA), ethylene copolymers with unsaturated carboxylic acids (e.g. EAA, EMAA), ionomers. Ethylene/$\alpha$-olefin copolymers with low densities (less than 0.92 g/cm$^3$), prepared using metallocene catalyst techniques, are particularly suitable as sealing layer materials due to the low temperatures at which they start to melt and their high hot-tack properties.

Films containing the polymer mixture according to the invention can be used for the packaging of dry products (e.g. snacks, pasta) or moist products (e.g. meat, cheese, ready-to-serve meals, etc.) or deep-frozen products (e.g. ready-to-serve meals) or pharmaceutical products or sausage casings.

The polymer mixture according to the invention may be prepared in any compounding devices. It is recommended, however, that the nanoparticles be added during polymerisation of the polyamide in order to achieve high dispersion. Processing of the polymer mixture may be performed with any commonly used extrusion devices. A film may be prepared in any monolayer or multilayer blow moulding, flat film, coating or extrusion lamination unit. Furthermore, it is also possible to combine one or more of the production processes mentioned. Films prepared in this way may be printed using, for example, an intaglio printing or flexographic printing machine.

Test methods

Oxygen permeability is determined by the carrier gas method in accordance with draft DIN 53380 part 3, in the version dated July 1989. It is defined as the amount of oxygen in Nml which diffuses in 24 hours through one square meter of film at one bar pressure difference under specific atmospheric conditions. The oxygen permeability is measured using Ox-Tran 100 equipment from the Mocon Instrument Co. Oxygen permeability is quoted, unless specified otherwise, in $cm^3/(m^2*d*bar)$ at 75% relative humidity and a temperature of 23° C.

Cloudiness is quoted as the amount of light in % which is absorbed by the sample after illumination using a centralised beam with a solid angle of >8° up to a max. of 160°. It is given with respect to the total amount of light transmitted. Measurement is in accordance with ASTM standard D 1003-61, procedure A.

The viscosity of the polyamides is quoted, unless stated otherwise, as the viscosity index measured in 96% strength sulphuric acid in accordance with DIN 53727.

Sterilisation is performed in a pressurised water autoclave in aqueous surroundings at 121° C. for a period of 30 minutes. The heating up and cooling down times are 15 minutes.

Delamination of a film can be readily established by visual inspection of the edges of the film.

Examples and Comparison Examples

All the polymers mentioned are commercially available trade products. In the case of mixtures, unless stated otherwise, the concentrations of the individual polymers are expressed as wt. %.

Samples 1 to 3 were coextruded on a flat film unit. The bulk temperature of the melts was about 270° C. and the temperature of the casting roll was 100° C.

| Sample 1: | | |
|---|---|---|
| PA 6 | PA 6 | PA 6 |
| 16 μm | 36 μm | 16 μm |

The PA6 used has a viscosity index of 206. The PA6 is nucleated.

| Sample 2: | | |
|---|---|---|
| PA 6 | PA MXD6 | PA 6 |
| 16 μm | 36 μm | 16 μm |

The PA6 used in the outer layers is the same as the PA6 used in sample 1.

The PA MXD6 is a polymer consisting of m-xylylene diamine and adipic acid (Nylon-MXD6 6121 from the Mitsubishi Gas Chemical Europe Co.).

| Sample 3: | | |
|---|---|---|
| PA 6 | 80% PA MXD6 + 20% PAM1 | PA 6 |
| 16 μm | 36 μm | 16 μm |

The composition of PAM1 is 98% PA6 and 2% nanoparticles. The polymer PAM1 has a viscosity index of 194. Incorporation of the nanoparticles took place during polymerisation of the PA6. The shape of the nanoparticles is longitudinal, the lengths varying between 50 and 400 nm. The nanoparticles consist of aluminium silicate.

The PA MXD6 is the same as in sample 2. The PA used in the outer layers is the same as the PA6 in sample 1.

| Sample | Cloudiness before sterilisation | Cloudiness after sterilisation | Delamination after sterilisation | $O_2$-permeability [$cm^3/m^2*d*bar$)] before sterilisation |
|---|---|---|---|---|
| 1 | 7.4% | 12.9% | no | 18.5 |
| 2 | 5.4% | 57.2% | no | 4.0 |
| 3 | 6.3% | 11.3% | no | 2.9 |

The oxygen permeability was measured before sterilisation. The oxygen permeability after sterilisation is not significantly different from that measured before sterilisation.

It is extremely surprising that in sample 3 a polymer mixture was found which provided a better oxygen barrier than PA MXD6, despite the addition of PA6 and did not become cloudy during sterilisation.

We claim:

1. Mixture consisting of
   60 to 98 wt. % of a partially crystalline polyamide polymerized from m-xylylene diamine and adipic acid,
   2 to 40% wt. % of an aliphatic polyamide containing organic particles, inorganic particles or both with a particle diameter of less than 800 nm,
wherein the proportion of organic particles, inorganic particles or both in the polymer mixture is less than 10 wt. %.

2. Mixture according to claim 1, wherein the aliphatic polyamide is a polymer consisting of units of ω-aminocarboxylic acids or lactams or copolyamides consisting of units of ω-aminocarboxylic acids and lactams.

3. Mixture according to claim 1, wherein the nanoparticles are natural or synthetic sheet silicates.

4. Mixture according to claim 1, wherein the nanoparticles are oxides or nitrides of transition metals.

5. Mixture according to claim 1, wherein the nanoparticles are added to the aliphatic polyamide during its polymerization.

6. Moulded part containing a polymer mixture according to claim 1.

* * * * *